United States Patent [19]

Vasilchenko

[11] Patent Number: 4,611,958
[45] Date of Patent: Sep. 16, 1986

[54] BORING HEAD

[76] Inventor: Georgy A. Vasilchenko, ulitsa Khersonskaya, 1, kv. 103, Moscow, U.S.S.R.

[21] Appl. No.: 638,999

[22] Filed: Aug. 9, 1984

[51] Int. Cl.[4] .......................... B23B 51/00; B23B 3/26
[52] U.S. Cl. ....................... 408/168; 74/110; 74/569; 408/147; 408/153; 408/158
[58] Field of Search ............ 408/158, 168–170, 408/147, 150, 151, 153, 82; 82/1.4, 1.5, 2 E; 74/110, 569

[56] References Cited

U.S. PATENT DOCUMENTS

| | | | |
|---|---|---|---|
| 2,661,640 | 12/1953 | Rügg | 82/1.5 X |
| 4,121,697 | 10/1978 | Kobelt et al. | 74/110 X |
| 4,240,770 | 12/1980 | Berstein | 408/82 X |

FOREIGN PATENT DOCUMENTS 665994  6/1979  U.S.S.R. .................. 408/158

*Primary Examiner*—Gil Weidenfeld
*Assistant Examiner*—Steven C. Bishop
*Attorney, Agent, or Firm*—Lilling & Greenspan

[57] ABSTRACT

A boring head of a multiple-operation machine tool comprises a housing which accommodates a carriage carrying a mandrel for a cutting tool, and having a slanted surface to interact with a slanted surface of a rod arranged in the housing coaxially with the carriage and kinematically coupled to a drive which moves it in the axial direction. The housing also accommodates a fork arranged coaxially with the former and pressed against the carriage by a spring. At the ends of the fork are two slanted surfaces which are symmetrical with respect to the axis of rotation of the boring head. The fork interacts with the carriage on lines found in a plane extending through the axis of rotation of the boring head. The head further incorporates a rocker whose axle is installed in the housing on the side facing the two slanted surfaces of the carriage. The axle is parallel with the axis of rotation of the boring head. Mounted on the ends of the fork are rollers whose axles are in a plane extending through the line of contact between the rollers and the slanted surface of the carriage. Stops which are provided on the external lateral sides of the fork are in a plane extending through the axis of rotation of the boring head, and are parallel with the axles of the rollers and in contact with the housing.

2 Claims, 4 Drawing Figures

BORING HEAD

FIELD OF THE INVENTION

The present invention relates to machine tool manufacture and is more specifically concerned with boring heads of multiple-operation machine tools.

BACKGROUND OF THE INVENTION

There is known a boring head of a multiple-operation machine tool, comprising a housing which is kinematically coupled to a spindle and which accommodates a carriage carrying a mandrel for a cutting tool and has three slanted surfaces. One of the slanted surfaces is intended to interact with a slanted surface of a rod arranged in the housing coaxially with the latter, and kinematically coupled to a drive which moves the rod in the axial direction. The two other slanted surfaces are arranged symmetrically in relation to the axis of rotation of the boring head, and interact with rollers whose axles are perpendicular to the axis of rotation of the boring head and are mounted on the ends of a fork elastically pressed against the carriage. The fork is arranged in the housing coaxially with the latter. The rollers interact with the slanted surfaces on lines found on a plane extending through the axis of rotation of the boring head (cf. USSR Inventor's Certificate No. 665,994). The head in question does not provide for a high speed of response with regard to the rod motion; nor does it provide for a play-free motion of the carriage in the housing, because friction between the bearing surfaces of the fork and the housing bends the former. As a result, the fork may get jammed in the housing. Furthermore, the fork cannot properly position itself with respect to the two slanted surfaces of the carriage, which reduces the accuracy of machining and affects the efficiency of the machine tool.

SUMMARY OF THE INVENTION

It is an object of the present invention to improve the accuracy of machining.

It is another object of the invention to raise the efficiency of boring machines.

The invention provides a boring head of a multiple-operation machine tool, comprising a housing which is kinematically coupled to a spindle and accommodates a carriage carrying a mandrel for a cutting tool, and having a slanted surface to interact with a slanted surface of a rod arranged in the housing coaxially with the latter and kinematically coupled to a drive which moves the rod in the axial direction. Two additional slanted surfaces are arranged symmetrically with respect to the axis of rotation of the boring head and interact with rollers on lines found in a plane extending through the axis of rotation of the boring head. The axles of the rollers are mounted on the ends of a fork so that they extend at a perpendicular to the axis of rotation of the boring head; the fork is arranged in the housing coaxially with the latter and elastically pressed against the carriage. The boring head incorporates a rocker whose axle is installed in the housing on the side facing the two slanted surfaces of the carriage and is parallel with the axis of rotation of the boring head. In the boring head, auxiliary rollers are mounted on the ends of the fork for interaction with the rocker, the axles of the auxiliary rollers being parallel with those of the main rollers and arranged in a plane extending through the line of contact between the rollers and the slanted surfaces. External lateral sides of the fork have projections arranged in a plane extending through the axis of rotation of the boring head, and the projections are parallel with the axles of the rollers and in contact with the housing.

The fork interacts with the housing in a manner which prevents bending and jamming of the fork against the housing due to friction between the bearing surfaces of the fork and the housing. The rocker ensures a proper positioning of the fork with respect to the two slanted surfaces of the carriage. The projections of the fork provide for a symmetrical alignment of the fork in relation to the housing.

Being relatively simple in construction, the boring head according to the invention provides for free play of the carriage in the housing of the boring head, which considerably improves the accuracy of machining and raises the efficiency of the boring machine. The boring head of this invention is reliable in operation and has a long service life.

BRIEF DESCRIPTION OF THE DRAWINGS

Other objects and advantages of the present invention will become more apparent from a consideration of the following detailed description of a preferred embodiment thereof, taken in conjunction with the accompanying drawings, wherein.

DETAILED DESCRIPTION OF THE INVENTION

Figure 1:
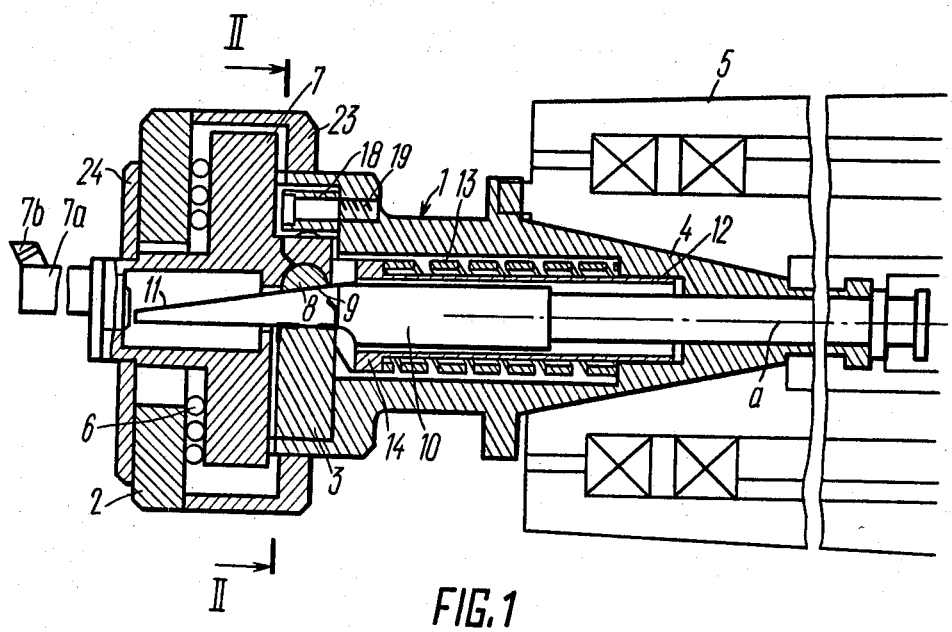
FIG. 1 is a side elevational view in partial cross section, of a boring head.

Referring to the attached drawings, the boring head according to the invention comprises a housing 1 (FIG. 1) having a cheek 2, a block 3, and a mandrel 4 kinematically coupled to a spindle 5 which rotates the boring head. The housing 1 accommodates rolling contact bearings 6 in which there is mounted a carriage 7 carrying a mandrel 7a with a cutting tool 7b.

Figure 2:
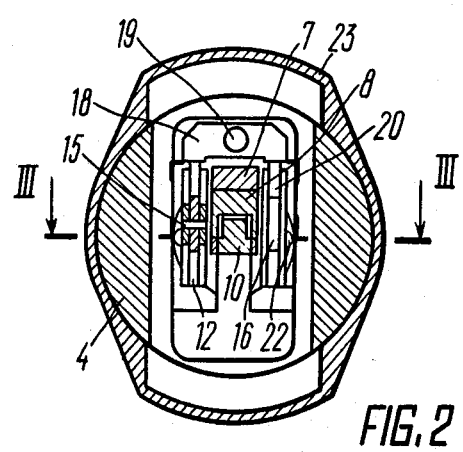
FIG. 2 is a cross sectional view taken along lines II—II in FIG. 1.
Figure 4:
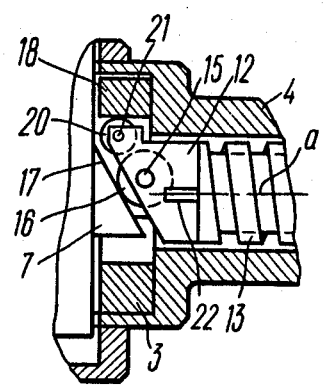
FIG. 4 is a cross sectional view taken along lines IV—IV in FIG. 3.
Figure 3:
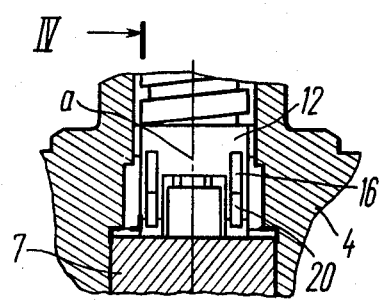
FIG. 3 is a cross sectional view taken along lines III—III in FIG. 2.

The carriage 7 accommodates a cylindrical finger 8 with a flat 9 which is its slanted surface. A rod 10 is arranged in the housing 1 coaxially with the latter. The rod 10 is kinematically coupled to a drive (not shown) which drives the rod 10 in the axial direction. The rod 10 has a slanted surface 11 to interact with the flat 9 of the finger 8 of the carriage 7 and move the carriage 7 in the radial direction. Arranged in the housing 1 coaxially with the latter is a fork 12 which is interposed between the housing 1 and the rod 10. The fork 12 is made hollow and is pressed against the housing 1 and the carriage 7 by a spring 13. One end of the spring 13 presses against the housing 1. Its opposite end presses against a shoulder 14 provided on the fork 12. Axles 15 of rollers 16 are symmetrically mounted on the ends of the fork 12 with respect to the axis "a" of rotation of the boring head. The axles 15 extend at a perpendicular to the axis "a" of rotation of the boring head (FIGS. 2 and 3) and interact with slanted surfaces 17 (FIGS. 3 and 4) of the carriage 7. The slanted surfaces 17 (FIG. 4) are symmetrically arranged in relation to the axis "a" of rotation of the boring head. The rollers 16 interact with the slanted surfaces 17 on lines found in a plane extending through the axis "a" of rotation of the boring head.

The housing 1 accommodates a rocker 18 whose axle 19 (FIG. 2) is secured in the mandrel 4 and is parallel with the axis "a" of rotation of the boring head, facing the slanted surfaces 17 (FIG. 4) of the carriage 7. The arms of the rocker 18 interact with auxiliary rollers 20 mounted on the ends of the fork 12. Axles 21 of the auxiliary rollers 20 are parallel with the axles 15 of the rollers 16 and arranged in a vertical plane extending through the line of contact between the rollers 16 and the slanted surface 17 of the carriage 7. Stops 22 are provided on the external surface of the fork 12. These serve to align the fork 12 symmetrically with respect to the carriage 7 and are arranged in a plane extending through the axis "a" of rotation of the boring head. The stops 22 are parallel with the axles 15 of the rollers 16 and in contact with the housing 1. The part of the housing where the carriage 7 is located is contained in an enclosure 23 (FIG. 1). On the side of the cheek 2 there is a guard 24 mounted on the carriage 7.

The boring head according to the invention operates as follows.

The tools 7b are fixed in the mandrel 7a of the boring head, which is rotated by the spindles. The rod 10 is in its extreme left position as illustrated in FIG. 1. As the head rotates, the rod 10 moves to the right. The spring 13 drives the fork 12 to the left until the auxiliary rollers 20 abut against the rocker 18. The rollers 16 abut against the slanted surface 17 of the carriage 7, driving the carriage 7 and the mandrel 7a with the tool 7b towards the axis "a" of rotation of the boring head. The force of the spring 13 is transmitted to the slanted surface 17, preventing play between the carriage 7, cylindrical finger 8, rod 10 and block 3, and between the carriage 7, rolling contact bearings 6 and cheek 2. This guarantees a high accuracy of machining. Depending on the position of the rollers 16, the auxiliary rollers 20 act on the arms of the rocker 18. The rocker 18 swivels about its axle 19, eliminating play between the auxiliary rollers 20, rocker 18 and axle 19 secured in the housing 1. The stops 22 of the fork 12 limit the range of movement of the fork 12 in the direction perpendicular to that of the motion of the carriage 7 and to the axis "a" of rotation of the boring head. Thus the fork 12 is maintained in a position symmetrical with respect to the carriage 7.

As the rod 10 moves to the left, the slanted surfaces 17 of the carriage 7 act on the rollers 16 and move the fork 12 to the right, overcoming the resistance of the spring 13. The auxiliary rollers 20, rocker 18 and stops 22 function as described above.

The rocker 18 and the auxiliary rollers 20 which interact with the rocker 18 provide for a proper positioning of the fork 12 and a good, jam free, contact between the rollers 16 and the slanted surfaces 17 of the carriage 7. The stops 22 of the fork 12 ensure a proper centering of the fork 12 in the housing 1.

The mutual positioning of the rocker 18, auxiliary rollers 20 and stops 22 reduces deformations of the fork 12. Reducing deformations of the rod 10, fork 12 and carriage 7 and preventing their jamming are factors which improve the response and raise the efficiency of the boring machine. According to preliminary estimates, the boring head, in accordance with the invention, raises the efficiency of boring machines by 15 to 20 percent and guarantees an accuracy rating of second class. The boring head of this invention is simple in design and inexpensive to manufacture. Prototype boring heads according to the invention are less expensive by 10 to 15 percent than conventional boring heads.

What is claimed is:

1. A boring head of a multiple-operation machine tool comprising:
    (a) a rotatable housing;
    (b) a means for rotating said housing;
    (c) a carriage having first and second ends, said first end having at least two slanted surfaces positioned in an oblique plane relative to an axis of rotation of said rotatable housing, said carriage mounted on bearings in one end of said housing and rotating in a similar direction as said rotatable housing;
    (d) a cutting tool mounted in a mandrel of said carriage and attached by one end to said second end of said carriage;
    (e) a substantially cylindrical finger element having at least one slanted surface and said finger element being positioned in said first end of said carriage;
    (f) a rod coaxially positioned in said rotatable housing and having a slanted surface interacting with said slanted surface of said finger element of said carriage, wherein as said rod is turned said carriage is caused to turn in said similar direction as said rotatable housing and said cutting tool mounted in said carriage mandrel is caused to rotate in the same direction;
    (g) a fork encircled by a spring and coaxially positioned in said rotatable housing near said rod in such a manner, whereby as said rod rotates in one direction said spring is caused to move said fork in an opposite direction;
    (h) at least one pair of main rollers mounted on a first end of said fork and interacting with said slanted surfaces on said first end of said carriage, said main rollers having axles attached on one end of said rod and extending in a perpendicular plane relative to said axis of rotation of said rotatable housing;
    (i) a rocker positioned between said pair of main rollers and said housing near said first end of said fork, and having an axle secured in said housing on a side of said housing facing said slanted surfaces of said carriage, said axle being parallel with said axis of rotation of said housing; and
    (j) at least one pair of auxiliary rollers mounted on said first end of said fork between said main rollers and said rocker, said auxiliary rollers having axles parallel with said axles of said main rollers and attached to said fork in a plane extending through a line of contact between said main rollers and said slanted surfaces of said carriage rollers, said auxiliary rollers moving in a similar direction with said fork and preventing movement of said fork as said auxiliary rollers but against said rocker.

2. A boring head of a multiple-operation machine tool according to claim 1 wherein said means for rotating said housing comprises: a housing mandrel having first and second ends, said first end insertably coupled to a spindle near a second end of said fork, and said second end of said housing mandrel coupled to a block attached to a cheek adjacent to said carriage.

* * * * *